United States Patent [19]
Brieden

[11] Patent Number: 5,585,705
[45] Date of Patent: Dec. 17, 1996

[54] PROCESS FOR MONITORING MOVEMENT OF CLOSURE DEVICES WHICH MAY BE ADJUSTED BY MOTORS

[75] Inventor: Michael Brieden, Iserlohn, Germany

[73] Assignee: Leopold Kostal GmbH & Co. KG, Ludenscheid, Germany

[21] Appl. No.: 433,159

[22] Filed: May 3, 1995

[30] Foreign Application Priority Data

May 5, 1994 [DE] Germany .......................... 44 15 857.2
Apr. 15, 1995 [DE] Germany ........................ 195 14 257.8

[51] Int. Cl.$^6$ ............................ G05B 9/02; H02P 1/22; E05F 15/10
[52] U.S. Cl. ..................... 318/467; 318/266; 318/286; 318/468; 388/907.5
[58] Field of Search ................... 318/264, 265, 318/266, 286, 430, 431, 434, 466, 467, 468, 469; 388/903, 907.5, 909

[56] References Cited

U.S. PATENT DOCUMENTS

| | | | |
|---|---|---|---|
| 4,514,670 | 4/1985 | Fassel et al. | 318/467 |
| 4,641,067 | 2/1987 | Iizawa et al. | 318/287 |
| 5,170,106 | 12/1992 | Ogasawara | 318/434 |
| 5,298,840 | 3/1994 | Yoshino et al. | 318/268 |

FOREIGN PATENT DOCUMENTS

3034118C2 12/1983 Germany .
3136746C2 4/1988 Germany .

*Primary Examiner*—Bentsu Ro
*Attorney, Agent, or Firm*—Brooks & Kushman PC

[57] ABSTRACT

A process for the monitoring of, in particular, the closing of a motor-operated aggregate, preferably for use in motor vehicles, for example a vehicle window or sliding roof. A motor which is connected to the vehicle electrical supply system is switched off by means of switching elements and/or a sensor which detects characteristic values of the aggregate and a data processing system including storage and comparing means. Switch off occurs during the closing process within a predetermined (central) portion of the closing travel, when a value dependent on the motor rpm or the speed of the aggregate exceeds a threshold value based on a stored reference value. A monitoring system is effective in the start-up phase of the motor. In the start-up phase of the motor, therefore, an initial threshold value based on a reference value detected towards the end of the previous adjustment process and then stored, is compared with the current motor period value.

7 Claims, 2 Drawing Sheets

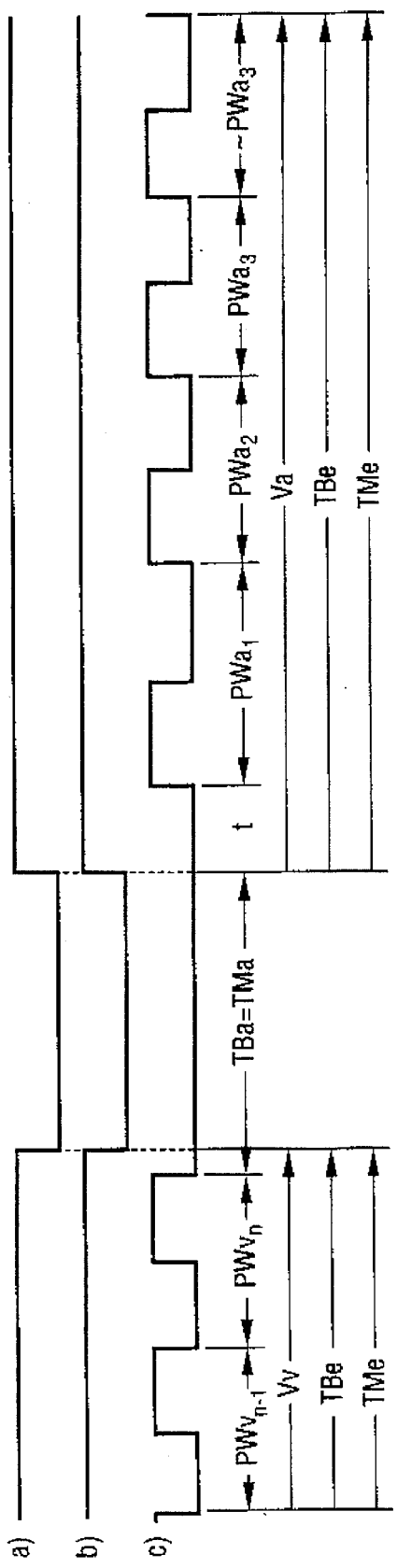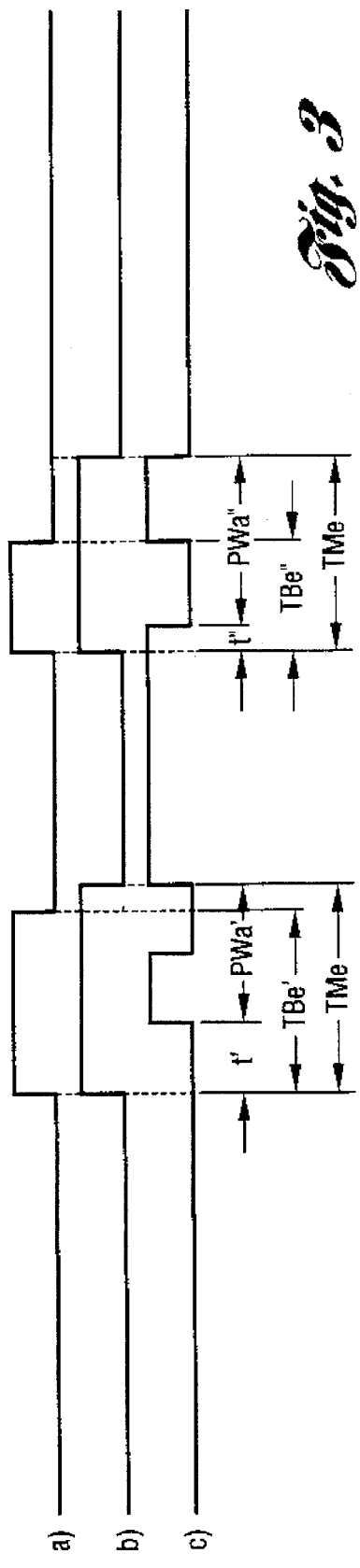

5,585,705

PROCESS FOR MONITORING MOVEMENT OF CLOSURE DEVICES WHICH MAY BE ADJUSTED BY MOTORS

TECHNICAL FIELD

The invention concerns a process for monitoring the movement of closure devices which may be adjusted by means of motors, such as vehicle windows and sliding roofs.

BACKGROUND ART

A process for monitoring the movement of closure devices which may be adjusted by motors, for example for use in conjunction with power windows, has become known in German patents DE 30 34 118 C2 and DE 31 36 746 C2. That reference discloses Hall sensors which are allocated to the power window motor and provide one signal per motor period, one motor period being one complete revolution of the motor. The signals are intended to determine the distance which has been travelled by the adjustable closure device, which shall hereafter be referred to as a window, or its current position, and they also determine the time taken by any given current motor period. This monitoring is generally active within a central portion of the window travel. The current motor period time value is compared with a threshold value derived from a previous motor period time value which is subject to continuous updating. If the current motor period time value is greater than the threshold value, the power window motor is switched off or reversed because it is probable that the movement of the window is being influenced or blocked by an obstacle.

This type of monitoring can generally be considered satisfactory. However, when the power window is switched on, monitoring only begins after one full motor period, because before then no prior motor period time value is available. This means, that after short operations of the operating elements, in other words, with activation of the power window motor for a time which is shorter than the time necessary for a full motor period, the window can be moved without check against an object which may be blocking the window, thus causing possible danger or injury to the same. In addition, as the motor period varies quite considerably during the start-up phase of the motor, a stable state, or even running of the motor, is only reached after about three motor periods. Hence, satisfactory protection in the case of excessive force being produced against the motor can only be assured after this time.

SUMMARY OF THE INVENTION

The invention includes a motor which is connected to a supply voltage and which, for primary operating purposes, is switched on and off by means of driver-interface switches. Behavior of the system is also influenced by a data-processing device working together with a sensor and including storage and comparing elements.

The data-processing device initiates a signal to stop the motor when, during closure, a time value dependent on the rpm or motor speed exceeds a threshold value. This system is so designed that this procedure is only applied when the window is within a safety-relevant zone.

The present invention aims to implement a monitoring process which is effective also during the start-up phase of the motor.

This aim is realized in that an initial motor period threshold value which is calculated from at least one motor period value from the end phase of the previous safety-relevant adjustment of the aggregate, as determined by the rpm or speed sensor, is compared with the current motor period value.

The invention differs from the art already known in the field in that a value which was stored during the preceding, rather than the current operation of the motor is used for the determination of an initial motor period threshold value. Thus, the current motor period value can be compared with this initial motor period threshold value from the first motor period onwards.

For this monitoring in the start-up phase of the motor, the initial motor period threshold value (PGW*) is preferably based on the final motor period value (PGvn) of the previous motor operation according to the following formula:

$$PGW^* = 2 \times PGvn \times (0.5 + e^{-t/\tau})$$

using a time factor t. Factor t is the time lying between the beginning of motor activation and the start of measurement of the first current motor period value (PWa) by the sensor. The formula also includes a time constant ($\tau$) in the region of approximately 20 milliseconds. This initial motor period threshold value is then usually augmented by a margin of 10% to prevent inappropriate emergency opening of the windows.

Further simple control during the initial operation phase can be achieved by using the known behavior of the power window motor up to the third motor period. To do this, the motor period value from the motor period which has just been completed is taken as the current motor period threshold value and compared with the current motor period value. A further step ensures reliable monitoring of the power window motor during the start-up period—even if the operating elements are only operated for a very short period of time. A very short period of time is a time which is less than that needed for one complete revolution of the motor. This step includes synchronizing the switch off point of the motor with the end of a motor period, thereby allowing the motor to run on beyond the point when actuation of the switch has ceased if necessary.

A particular example of the invention will now be described with the help of the drawings listed below.

BRIEF DESCRIPTION OF THE DRAWINGS

FIG. 2 depicts a switch on signal from the switching elements (a), the motor current (b), and the sensor signal from the power window motor (c) with a pause in operation and inactivation of the system; and FIG. 3 depicts the same 3 signals as in FIG. 2 showing in particular the completion of a full motor period after cessation of the switch on signal (a).

BEST MODE FOR CARRYING OUT THE INVENTION

Figure 1:
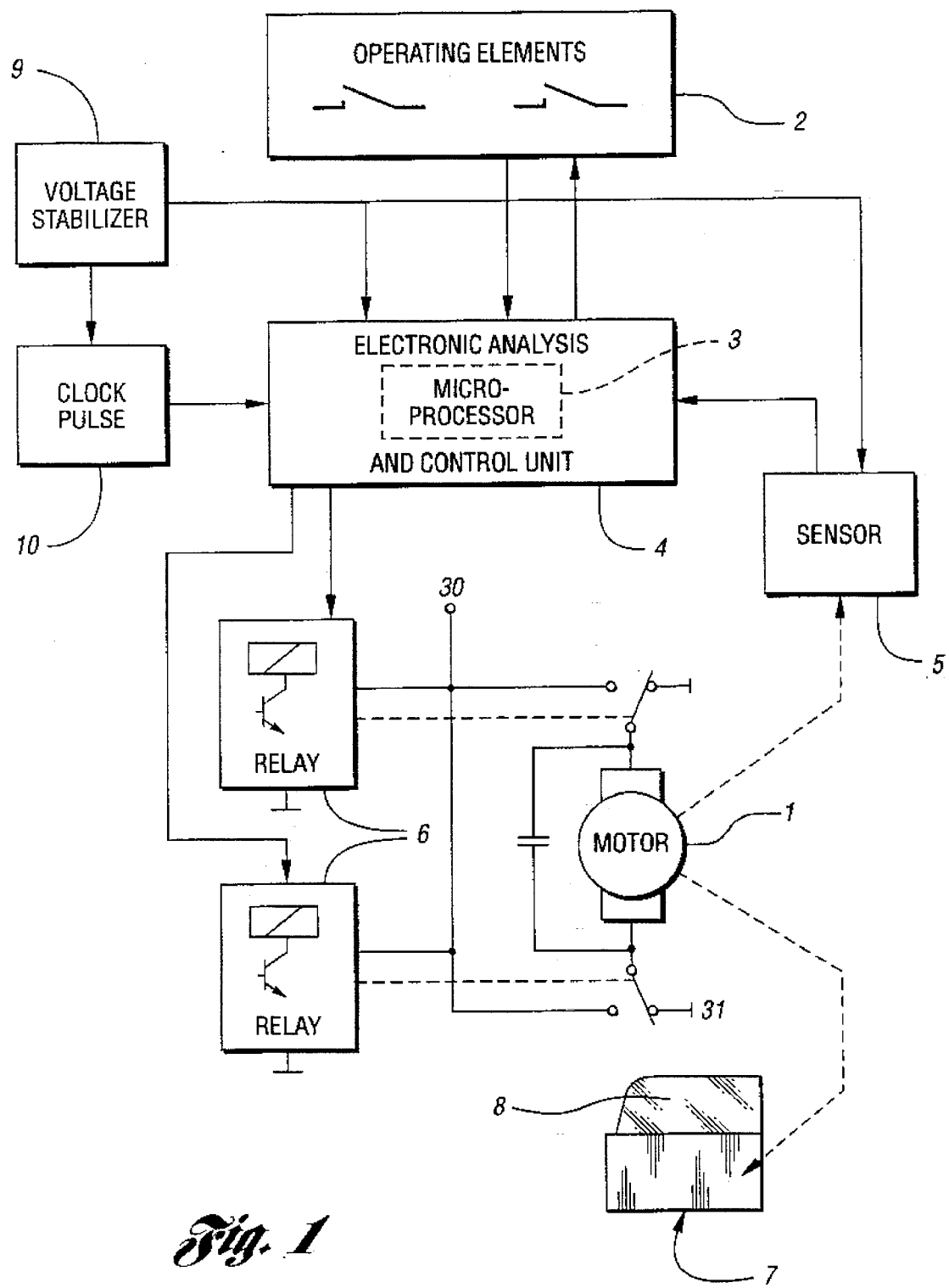
FIG. 1 shows a circuit diagram for the monitoring of a system whose position can be adjusted by means of motors.

The circuit diagram shown in FIG. 1 comprises a switching arrangement assigned to a power window motor 1 included in a power window system and influenced by operating elements, the arrangement being provided with an electronic analysis and control unit 4 which in turn is provided with a microprocessor 3. This switching arrangement is responsible for total monitoring of the system. "Window open" and "window close" commands are initiated by means of operating elements which may, for example, be in the form of push-button switches. With these commands the activation of the power window motor in the appropriate direction is also initiated, leading to movement of window 8, situated in vehicle door 7. Microprocessor 3 triggers the power switching elements 6, for example relays, appropriately dependent on the operation of operating elements 2 so as to achieve "opening" or "closing" operation. The power window motor is connected with the appropriate polarity to the vehicle voltage supply by means of terminals 30,31. Sensor 5, preferably in the form of a Hall sensor, emits a signal during each motor period, which is analyzed by microprocessor 3. In addition, a voltage stabilizing stage 9 and a clock-pulse phase 10 are incorporated into the switching arrangement in a known manner.

As is usual in such equipment after the motor start-up phase, when motor operation has stabilized, each motor period of power window motor 1 is established as motor time period value PW. From this motor time period value a motor period threshold value PGW is calculated, which is then compared with the following period value. If the motor period threshold value is exceeded by the current motor period value, an obstacle is taken to be present, leading to switching off and, if appropriate, reversal of the power window motor.

Referring now to FIG. 2, in the present invention, when operating element 2 provided for the "window close" function is operated following an interruption in which TBa=TMa (operating elements in the "off" position with the power window motor switched off), power window motor 1 enters the start-up phase. Nevertheless there is as yet no motor time period value PW available from which a motor time period threshold value can be calculated.

In FIG. 2, $PWv_n$ and $PWv_{n-1}$ are respectively the motor period signals of a current and prior period of operation. The line (a) represents the switching on signal of the operating element; (b) represents the motor current and (c) represents the sensor signal. $V_v$ represents window displacement; TBe represents the switching element; TMe represents power window motor "on"; and TBa represents switching element "off"

In the start-up phase of the power window motor which is activated over the period TMe (motor on) and which generates the current window displacement Va, therefore, a provisional motor period threshold value PGW* is determined for the first motor period PWa, which begins with the first signal impulse delivered by Hall sensor 5, at least one motor period value delivered by Hall sensor 5 towards the end of the previous safety-relevant Vv of the window. This means that anti-jamming protection is already effective within the first motor period.

As the start-up behavior of power window motor 1 is negatively exponential, the following is a near representation of the initial motor period threshold value $$PGW^* = 2 \times PWvn \times (0.5 + e^{-t/\tau})$$

where t is the time elapsing between the beginning of motor activation and the beginning of the first current motor period value ($PWa_1$) delivered by Hall sensor 5 and $\tau$ is a time constant of the power window motor lying in the region of about 20 milliseconds. These 20 milliseconds are characteristic of the motor used within a particular window lift system. It is the time which elapses between current being applied to the motor and the motor reaching 70% of its final speed.

The threshold which is derived according to the above formula is also adjusted further by adding a safety margin of approximately 10% in order to prevent inappropriate switching off of the motor by compensating e.g., for manufacturing variables or environmental conditions. These steps give rise to an adjusted initial motor period threshold PGW*.

After the first motor period, further updated motor period threshold values $PWa_2$, $PWa_3$ are calculated until the motor has reached a stable condition.

For the second and third motor periods the following is a near representation:

$PWa_2 = 0.83 \times PWa_1$ $PWa_3 = 0.92 \times PWa_2$, which is about equal to $0.75\ PWa_1$.

This means that the first motor period is greater than the second and the second greater than the third. For the monitoring and therefore for the switching off of power window 1, the first determined motor period value $PWa_1$ is used as the motor period threshold value for the second motor period, and the second motor period value $PWa_2$ is used as the motor period threshold value for the third motor period. These motor period thresholds can be corrected by a multiplication factor (F) of approximately 1–1.25 in order to compensate for tolerances within each individual window lift system. After the third motor period, motor period threshold PGW is in any case calculated using the motor period value PW from the preceding completed motor period.

Adjustment of the window by short operations of operating elements 2, may result in operations which are shorter than one motor period. Monitoring of these is also possible, as depicted in FIG. 3. As shown in this figure, a full motor period is implemented even with switch operation times TBe' and TBe" which are shorter than a normal motor period. This is achieved by delaying switch off of the motor unit until the relevant motor period, as detected by the sensor, has been completed. This in turn is accomplished by synchronizing the end of motor activation TMe with the end of motor period value PWa' or PWa". This value which is delivered by the Hall sensor 5 and begins after time t' or t", depending on the sensor's starting position. If the precalculated motor period threshold PGW* lies below motor period values PWa' or PWa", the power window motor is switched off as a safety function.

While the best mode for carrying out the invention has been described in detail, those familiar with the art to which this invention relates will recognize various alternative designs and embodiments for practicing the invention as defined by the following claims.

What is claimed is:

1. A process for monitoring and controlling movement of a closure device which can be controlled by a motor to provide anti-jamming protection, comprising:

connecting the motor to a supply voltage;

switching off the motor in response to an arresting signal indicative of an obstacle to movement of the closure device, the signal being generated by a data processor provided with storage and comparing means, wherein the switching off step includes:

determining a motor time period value (PWv) dependent on the rpm of the motor or the speed of movement of the closure device during a previous safety-related control of the device;

deriving an initial time period threshold value (PGW*) based on PWv of the previous safety-related control of the device according to the formula $$PGW^* = 2 \times PWvn \times (0.5 + e^{-t/\tau})$$

wherein

PWvn is a last period valve of the motor time period values (PWv), t is the time elapsing between the start of motor activation and the beginning of the first current period value supplied by the sensor and $\tau$ is a time constant of the closure device, where $\tau$ is approximately 20 milliseconds;

detecting a current motor time period value (PWa);

comparing PWa with PGW*; and generating the arresting signal if PWa exceeds ·PGW*.

2. A process according to claim 1 wherein the initial period threshold value (PGW*) is augmented by a safety margin of about 10%.

3. A process according to claim 1 wherein, during the start-up phase of the motor, the motor is not switched off until completion of a sensor signal cycle (PW).

4. A process according to claim 1 further comprising:

comparing during the start-up phase of the motor the period value ($PWa_1$ or $PWa_2$) according to the prior motor period to the current period value ($PWa_2$ or $PWa_3$, respectively), thereby considering the known start-up behavior of the motor.

5. A process according to claim 5 further comprising:

multiplying the prior motor time period value ($PWa_1$ or $PWa_2$) by an adjustment factor which considers start-up behavior of the motor.

6. A process according to claim 5 wherein the factor (F) lies in the range of about 1–1.25.

7. A process according to claim 1 wherein the signal representing the rpm or the speed is supplied by a Hall sensor which generates digital impulses.

* * * * *